United States Patent [19]

Imanishi et al.

[11] Patent Number: 5,365,829
[45] Date of Patent: Nov. 22, 1994

[54] TRANSFER DRIVER FOR PRESSING MACHINE

[75] Inventors: Shozo Imanishi, Sagamihara; Toshihiko Arai, Shiroyama, both of Japan

[73] Assignee: Aida Engineering, Ltd., Kanagawa, Japan

[21] Appl. No.: 997,946

[22] Filed: Dec. 31, 1992

[51] Int. Cl.⁵ ............................................... F15B 13/16
[52] U.S. Cl. ...................................... 91/361; 91/459; 60/425; 60/459
[58] Field of Search .................. 91/361, 363 R, 363 A, 91/459, 42, 508, 170 MR; 60/425, 459

[56] References Cited

U.S. PATENT DOCUMENTS

| | | | |
|---|---|---|---|
| 3,729,969 | 5/1973 | Gibson et al. | 72/127 |
| 4,031,788 | 6/1977 | Boge et al. | 83/380 |
| 4,235,156 | 11/1980 | Olsen | 91/363 R |
| 4,470,787 | 3/1984 | Gram | 425/150 |
| 4,757,746 | 7/1988 | Ginzburg | 91/361 |
| 4,924,671 | 5/1990 | Reinert | 60/428 |
| 5,012,722 | 5/1991 | McCormick | 91/361 |
| 5,119,717 | 6/1992 | Yasutome | 91/361 |

FOREIGN PATENT DOCUMENTS

| | | |
|---|---|---|
| 0068389 | 6/1978 | Japan .................. 91/361 |
| 0062701 | 4/1984 | Japan .................. 91/363 R |
| 61-122028 | 8/1986 | Japan . |
| 63-17540 | 5/1988 | Japan . |
| 63-22895 | 5/1988 | Japan . |
| 63-24776 | 5/1988 | Japan . |
| 2-93030 | 7/1990 | Japan . |

*Primary Examiner*—Edward K. Look
*Assistant Examiner*—Hoang Nguyen
*Attorney, Agent, or Firm*—Steven M. Rabin

[57] ABSTRACT

An apparatus for operating feed bars to move a workpiece between stages of a pressing machine includes cylinder devices. Each of the cylinder devices serves to move the feed bars linearly and each has a respective absolute encoder. The cylinder devices include a feed cylinder device which is responsive to hydraulic pressure to linearly advance and return the feed bars. First and second clamp cylinder devices are responsive to hydraulic pressure to move the feed bars linearly so as to clamp and unclamp the workpiece between the feed bars A hydraulic pressure supply circuit is connected commonly to each of the cylinder devices. Hydraulic pressure is applied to the cylinder devices through respective servo valves of a hydraulic valve arrangement. The servo valves are selectively actuatable to apply the hydraulic pressure from the hydraulic pressure supply circuit to drive the associated cylinder device, and thus the feed bars, with a predetermined stroke and at a predetermined speed in response to a feedback signal from the absolute encoder of the associated cylinder device. A driver control device controls the hydraulic valve arrangement so that the servo valves are actuated in a predetermined sequence. In this way, the feed bars are actuated directly for linear movements with minimum energy.

21 Claims, 4 Drawing Sheets

TRANSFER DRIVER FOR PRESSING MACHINE

CROSS-REFERENCE TO RELATED APPLICATION

This application corresponds to the inventors' Japanese Patent Application No. 3-154295, filed Jun. 26, 1991, the entire disclosure of which is incorporated herein by reference.

BACKGROUND OF THE INVENTION

1. Field of the Invention

The present invention relates to a transfer driver device for a pressing machine, and particularly to the transfer driver device which employs a plurality of precision positioning cylinder devices and a common minimum capacity hydraulic supplier means.

2. Description of the Related Art

Transfer pressing machines are provided with transfer driver devices, and transfer mold materials (semi-finished products) through multiple stages in a sequential and automated manner.

Included in these transfer pressing machines are two types: one is a two-dimensional type which allows feed bars to move in advance/return mode and clamp/unclamp mode and the other is a three-dimensional type which allows feed bars to move in above two modes plus lift/down mode. In both types, since the motion of the feed bar must be in cooperation with the up and down stroke of a slide, the feed bar is driven by a link mechanism, a rack and pinion mechanism, a planetary gear mechanism or the like through a crank mechanism and rotating cams which rotate in synchronism with a crank shaft.

Such mechanical transfer driver devices have been disclosed by Japanese Utility Model Laid Open No. 61-122028, Japanese Utility Model Application Publication No. 63-17540, Japanese Utility Model Application Publication No. 63-24776 and Japanese Utility Model Laid Open No. 2-93030.

A motor-driven transfer driver device, as opposed to the above mechanical transfer driver devices, is proposed, for example, in Japanese Patent Application Publication No. 63-22895. In such a motor-driven transfer driver device, a reversible variable-speed motor is used as a mover. To drive feed bars, the rotary motion of the motor is converted into linear motion by means of a rack and pinion mechanism, ball screw, splined shaft or the like.

The conventional mechanical transfer driver devices described above need a number of parts, and are bulky and complex in construction and thus costly to manufacture. Furthermore, switching of the feed stroke and the feed rate is normally difficult. In the conventional mechanical transfer driver devices, insufficient room is provided for achieving a compact and low cost design and adaptability to a diversity of applications.

In contrast, the motor-driven transfer driver devices are more flexibly adapted to compact and low cost design. From the viewpoint of cost, however, the motor-driven transfer driver devices do not necessarily satisfy low cost design requirements because the rack and pinion mechanism for converting the rotary motion into the linear motion remains costly. Furthermore, each of the feed, clamp and lift modes needs its own dedicated motor and associated driver control device, requiring a large scale power supply system. This leads to a poor operating efficiency, jeopardizing power saving efforts.

Proposed as another mover is a hydraulic generator device which uses cylinder mechanisms on each of which a plurality of cams is coaxially disposed. The rotation of the cams drives a corresponding cylinder mechanism. The use of such a device is not widespread, because the construction of the device, except the mover portion, needs a number of parts and thus the device itself becomes costly.

SUMMARY OF THE INVENTION

It is an object of the present invention to provide the transfer driver device of a pressing machine which is easy to handle, compact, and low cost, while saving power and widening adaptability to a diversity of applications.

Recognizing that the above-described problems are attributable to the conversion of the rotary motion of a crank shaft or a motor, and recognizing the basic technical logic of transfer driving, that feed bars are not allowed to move both in advance/return and clamp/unclamp modes at the same time, the present invention is characterized by cylinder devices which directly drive the feed bars in a linear motion, and common minimum capacity hydraulic supplier means which switches between the cylinder devices to drive, in order to achieve the above-described object.

The transfer driver device a pressing machine according to the present invention comprises a feed cylinder device with an absolute encoder, for applying force in an advance/return mode to feed bars, a pair of left and right clamp cylinder devices with absolute encoders, for applying force in a clamp/unclamp mode to the feed bars, common hydraulic pressure supplier means for supplying hydraulic pressure for motion activation to each of the cylinder devices, hydraulic valve means, having a plurality of servo valves directly controlling each cylinder device in response to feedback signal from the absolute encoder of each cylinder device, for supplying hydraulic pressure from the hydraulic pressure supplier means to each of the cylinder devices, so that each cylinder device is driven at a predetermined stroke and speed, and driver control means for selecting between the hydraulic valve means according to a predetermined sequence.

In the operation of the pressing machine according to the present invention, the driver control means switches and control each of the hydraulic valve means in accordance with the predetermined sequence.

Each cylinder device is directly driven to move linearly according to the predetermined stroke at the predetermined speed each time the servo valves of the hydraulic valve means are switched on. The advance, unclamp, return and clamp motions of the feed bar may be performed in a smooth manner. Since the mechanism of conversion of rotary motion to linear motion is dispensed with, every motion is performed precisely and quickly. This also permits a compact design to be incorporated.

Since each motion is performed in a sequential manner, operating efficiency is enhanced, power saving is achieved, and the device is easy to handle. For example, in accordance with the advance/return motions, minimum hydraulic pressure supplier means may be continuously operated at the highest efficiency possible.

DETAILED DESCRIPTION OF THE INVENTION

Figure 1:
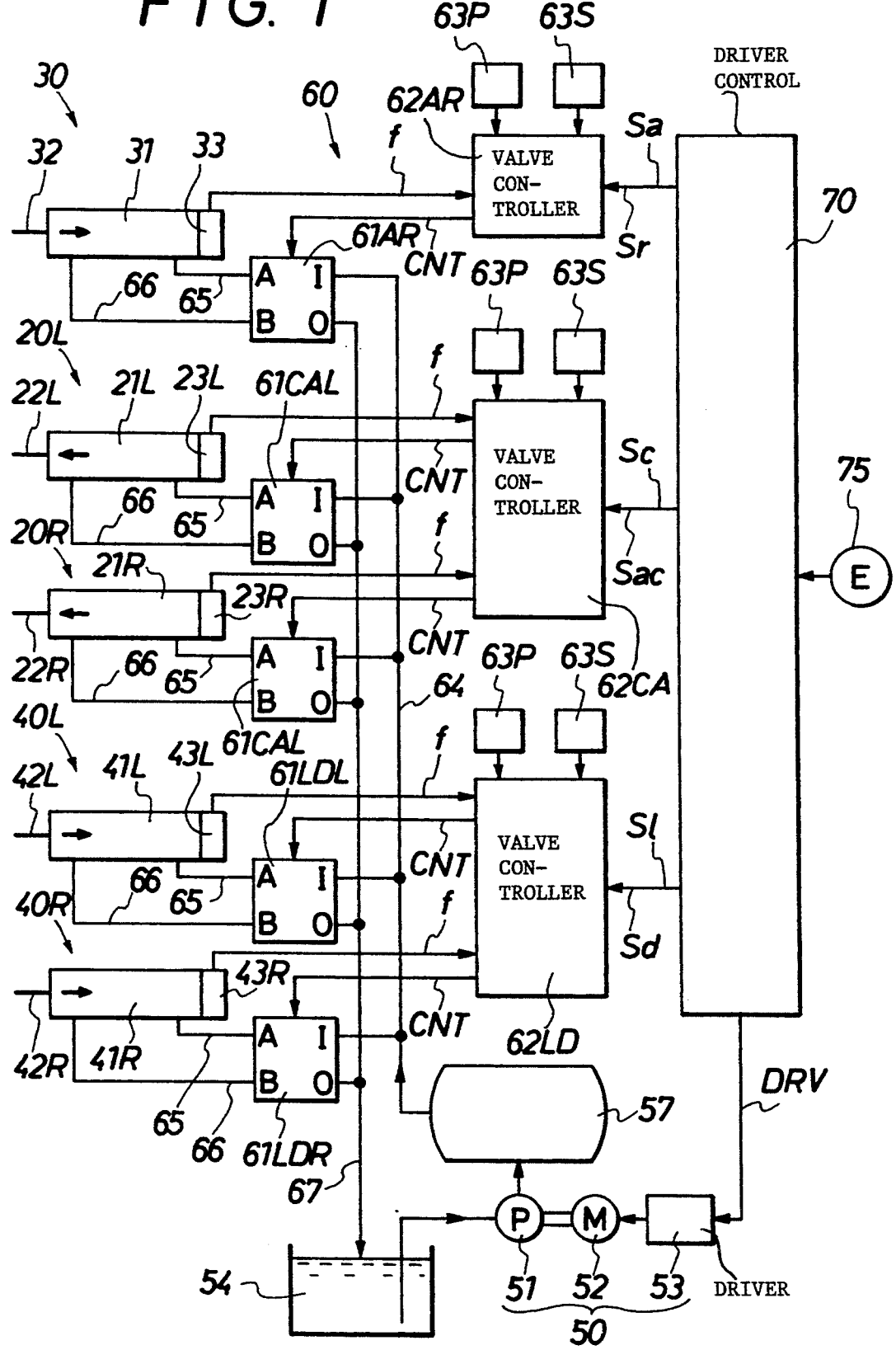
FIG. 1 is a general block diagram showing an embodiment of the present invention.

Referring now to the drawings, an embodiment of the present invention is discussed below.

As seen from the drawings, the transfer driver device comprises a feed cylinder device 30, a pair of left and right clamp cylinder devices 20L, 20R, a pair of left and right lift cylinder devices 40L, 40R, common hydraulic pressure supplier means 50, hydraulic valve means 60 including a plurality of servo valves, and driver control means 70, whereby the cylinder devices performing linear motion directly moves linearly the feed bars 10F, 10B, accomplishing a three-dimensional transfer function.

Figure 2:
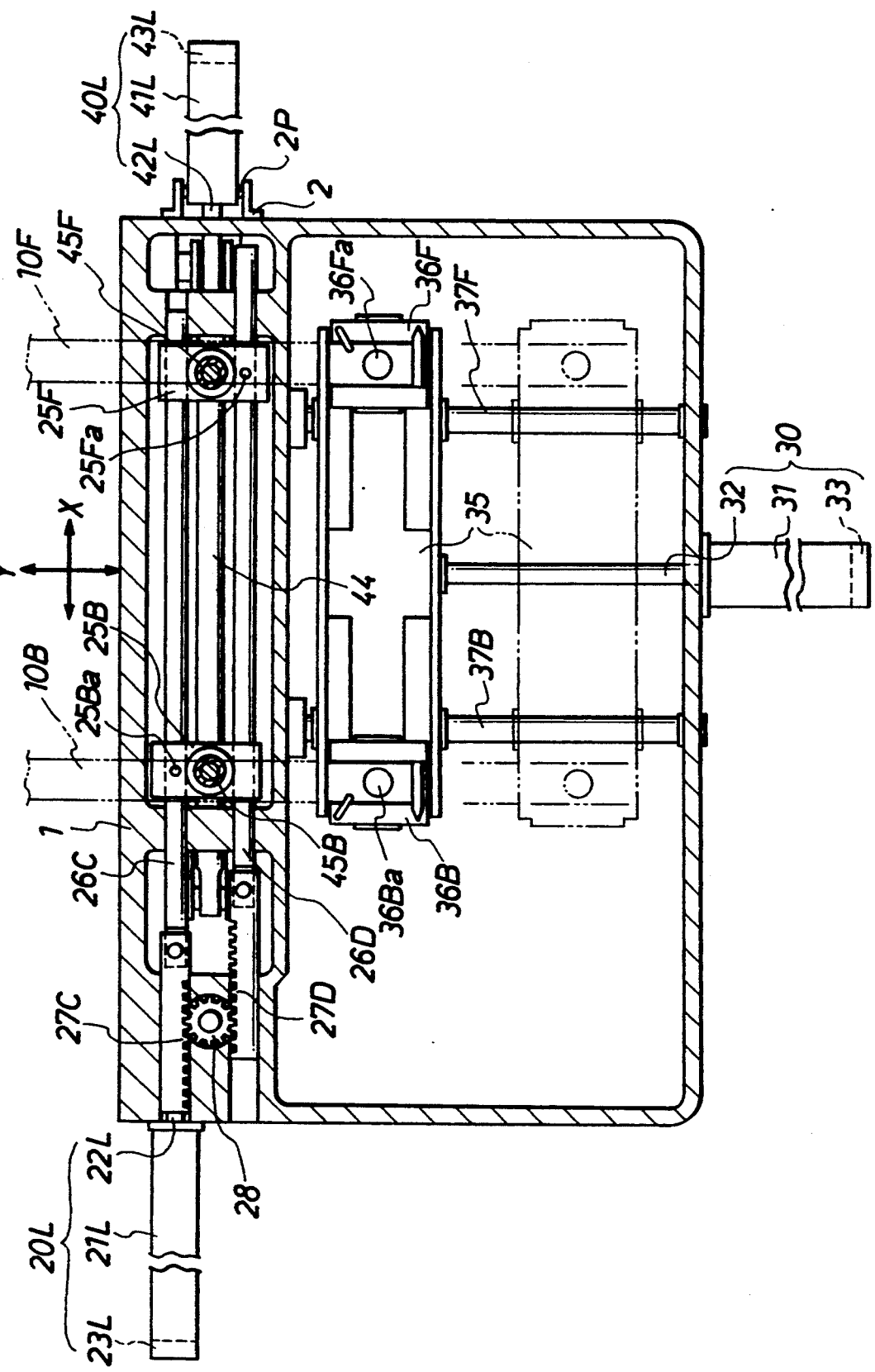
FIG. 2 is a plan view showing linkage between cylinder devices and feed bars.

Each cylinder device may be directly coupled to the feed bars 10F, 10B. In this embodiment, however, each cylinder device is coupled to the feed bars 10F, 10B via a coupling mechanism such as the one consisting of a pinion 28, clamp driver shafts 26C, 26D, and lift pins 45F, 45B as shown in FIGS. 1 and 2, mainly for the purpose of minimizing the number of cylinder devices and hydraulic valve means for compact and low cost design. The coupling mechanism is of a type which allows the linear motions of the feed bars 10F, 10B by the linear motions of the cylinder devices 20L, 20R, 30, 40L, 40R, rather than a type which converts rotary motion into linear motion. Unlike the conventional device which uses a planetary gear mechanism, crank mechanism and the like neither a cost increase nor a bulky construction may result.

Figure 3:
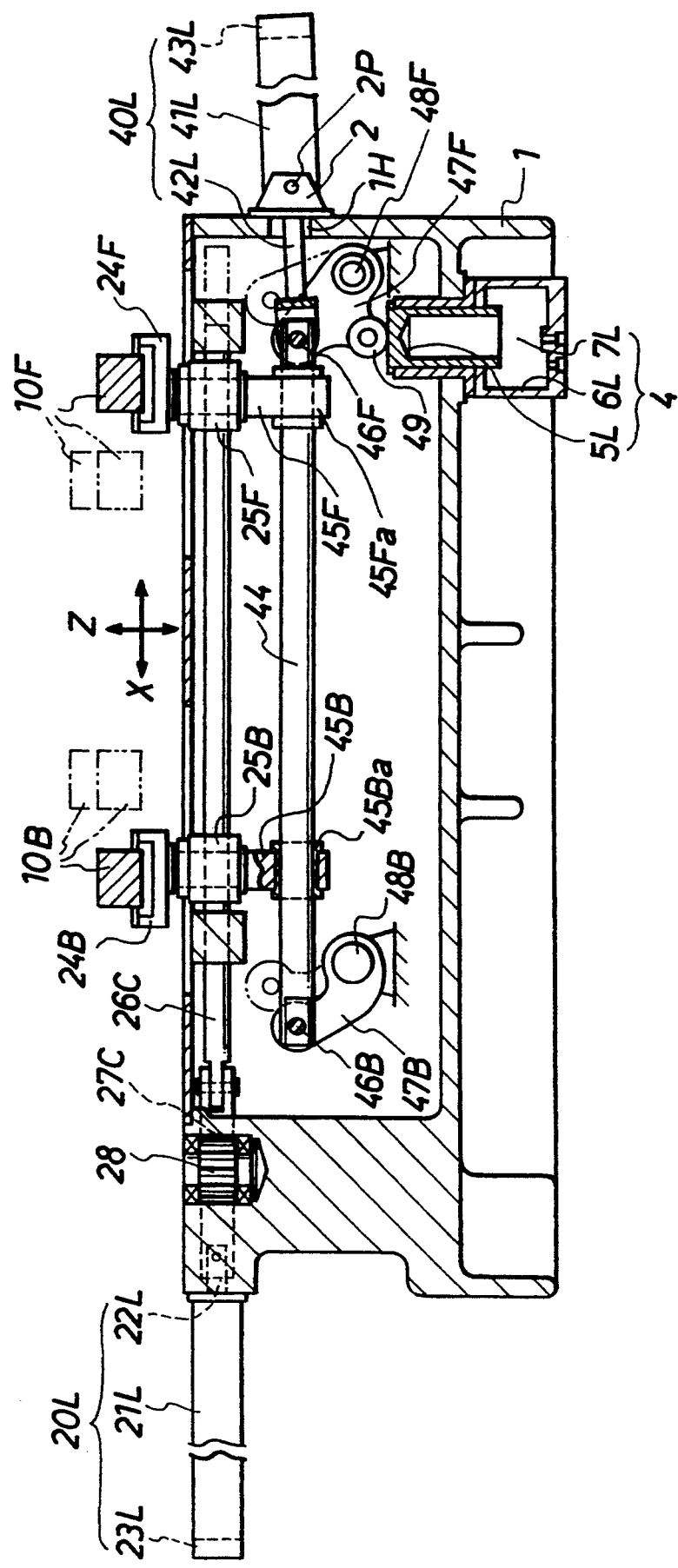
FIG. 3 is a cross-sectional side view showing linkage between the cylinder devices and the feed bars.

FIGS. 2 and 3 show views of the left hand side of the pressing machine. The X direction (fore-aft direction) is the clamp/unclamp direction of the feed bars 10F, 10B, the Y direction (left-right direction) is the advance/return direction, and the Z direction (up-down direction) is the lift/down direction.

Each of the cylinder devices (20L, 20R, 30, 40L and 40R) is an intelligent cylinder device, for example, one manufactured by Horiuchi Machinery Corporation, which is capable of accurate reciprocating linear motion with a predetermined stroke at a predetermined speed. Each of them is provided with a respective absolute encoder (23L, 23R, 33 43L and 43R) which transmits feedback signals f. The cylinder devices are of a hydraulically driven type.

As shown in FIG. 2, the feed cylinder device 30 is coupled to a pair of fore and aft feed bars 10F, 10B, via a slider 35 which is slidably supported by a coupling mechanism made up of a pair of guide rods 37F, 37B. Linear motion for an advance operation (in the direction from bottom to top in FIG. 2 or for a return operation is transferred directly to the feed bars 10F, 10B.

The end of the piston 32 of the feed cylinder device 30 is rigidly attached to the slider 35, and the left ends of feed bars in the Z direction along with the clamp blocks 25F, 24B, but are not displaceable in the X direction.

As seen from FIG. 2, the clamp block 25F (25B) is coupled to the clamp driver shaft 26D (26C) by the fixing pin 25Fa (25Ba), and both clamp driver shafts 26D, 26C are reversibly movable in the X direction via a rack member 27C, a pinion 28, and a rack member 27D.

When the clamp cylinder device 20L is driven, pushing both the piston 22L and the clamp driver shaft 26C to the right in FIG. 2, the rear (left hand side in FIG. 2) feed bar 10B is moved to the right via the clamp block 25B and the lift pin 45B. The clamp driver shaft 26D is then moved to the left by the rack members 27C, 27D and the pinion 28, and the front feed bar 10F is moved to the right by the clamp block 25F, and the lift pin 45F. Both feed bars 10F, 10B thus perform the clamp operation.

The left clamp cylinder device 20L in FIG. 2 applies the clamp/unclamp motion to each left end of the feed bars 10F, 10B, while the right cylinder device 20R in FIG. 1 applies the clamp/unclamp motion in synchronism with each right end of the feed bars 10F, 10B. The mechanisms operable with the right clamp cylinder device 20R, for clamp and unclamp operation on the right ends of the feed bars 10F, 10B, are similar in structure and operation to those for moving the left ends of the feed bars, so their illustration is omitted.

Namely, a pair of clamp cylinder devices 20L, 20R operating in synchronism apply the clamp/unclamp motion to both left and right ends of the feed bars 10F, 10B. In Japanese Utility Model Laid Open No. 2-93030 (FIG. 14), left and right clamp/unclamp mechanisms are linked for synchronism by a conventional link mechanism (70). No such link is required in the present invention. From this point of view, simple construction, low cost and compact design may be achieved.

The lift cylinder device 40L, provided to permit three-dimensional transfer functions, is a means for applying force onto both feed bars 10F, 10B for lift/down motion (in the Z direction). As seen from FIG. 3, the lift cylinder device 40L is coupled to the feed bars 10F, 10B via a lift/down coupling mechanism made of a lift bar 44, a pair of lift pins 45F, 45B, a pair of links 47F, 47B and the like.

Specifically, in FIG. 3, the lift bar 44 penetrates through the lift pins 45F, 45B at their lower end portions 45Fa, 45Ba in a manner that allows the lift bar 44 to slidably move in the X direction. Both ends of the lift bar 44 are rotatably supported by links 47F, 47B via pins 46F, 46B. The links 47F, 47B are rotatably supported by support pins 48F, 48B which are at the same level. The above arrangement allows the lift bar 44 to move up or down while remaining level.

A cylinder device 4, consisting of a piston 5L, a cylinder 6L and a cylinder room 7L, shown in FIG. 3 resists the link 47F so that the overall weight of the feed bars 10F, 10B, the clamp blocks 25F, 25B, the lift pins 45F, 45B, the lift bar 44 and the like may not directly act on the lift cylinder device 40L.

The cylinder 41L of the lift cylinder device 40L is rotatably supported at a pin 2a by a bracket 2 which is an integral part of the frame 1. The end portion of the piston 42L which penetrates through a hole 1H is rotatably supported at the pin 46F by the lift bar 44 in FIG. 3. Namely, when the link 47F is rotated clockwise (counterclockwise) to lift (lower) the lift bar 44, no undue force is applied to the cylinder device 40L.

The lift cylinder 40R disposed on the right hand side of the pressing machine is operable in synchronism with the left cylinder device 40L illustrated in FIGS. 2 and 3 in a manner similar to the operational relationship between the left clamp cylinder device 20L and the right clamp cylinder device 20R. The conventional link mechanism (such as the mechanism 70 of Japanese Utility Model Laid Open No. 2-93030 referred to above) is dispensed with.

The mechanisms operable with the right cylinder device 40R, for moving the right end of the feed bars up and down, are similar in structure and operation to those for moving the left side, and so their illustration is omitted.

Hydraulic pressure supplier means 50 is common to all the cylinder devices, and supplies hydraulic pressure to each of the cylinder devices 20L, 20R, 30, 40L and 40R for mechanical power generation. In this embodiment, a hydraulic pump 51 is included. Since the hydraulic pressure supplier means 50 is common to all the cylinder devices, each cylinder device does not have its own dedicated hydraulic pump.

The hydraulic pump 51, driven by the rotation of a motor 52 (and a driver 53), pressurizes hydraulic oil inside a oil tank 54. In this embodiment, an accumulator 57 is provided to prevent pulsating oil flow. Signal DRV represents a motor driving signal in FIG. 1.

Although the hydraulic pump 51 is common to the cylinder devices 20L, 20R, 30, 40L and 40R, its capacity is no larger than the capacity sufficient for driving only the largest cylinder device (lift cylinder device 30 in this embodiment). Of advantage is its small capacity, substantially smaller than the overall capacity required to drive all the cylinder devices (20L, 20R, 30, 40L and 40R) combined.

The present invention does not limit the number of pumps in use to a single hydraulic pump 51 only. The arrangement may be changed for convenience; for example, two half-capacity pumps may replace one full capacity pump. It should be understood that the implementation of a compact power supply system, the reduction of power consumption and the enhancement of operating efficiency are simultaneously achieved by selectively driving the cylinder devices by means of the hydraulic pressure supplier means 50, capable of driving the largest cylinder device 30 only. This arrangement is opposed to the conventional system in which 10F, 10B are coupled to feed blocks 36F, 36B onto the slider 35 by fixing pins 36Fa, 36Ba, respectively. The linear motion of the piston 32 is translated into the linear motion of the feed bars 10F, 10B.

As is evident from the above description, a dramatically simplified and low cost design thus results, compared to the mechanical transfer driver devices in the above-mentioned disclosures. Furthermore, the above arrangement minimizes room for feeding error.

Next, the clamp cylinder device 20L allows the feed bars 10F, 10B to mutually access (approach) or separate from each other along the X direction. Access motion means clamp operation, and separation motion means unclamp operation. A coupling mechanism is formed of a pair of clamp driver shafts 26C, 26D functioning as guide rods as well, slidably supported on a frame 1, clamp blocks 25F, 25B, feed bar guides 24F, 24B, and the like. The feed bar guides 24F, 24B allow the feed bars 10F, 10B to move in advance or return operations. Namely, the feed bars 10F, 10B are slid along the feed guides 24F, 24B in the Y direction.

The feed bar guides 24F, 24B are coupled to the clamp blocks 25F, 25B respectively by lift pins 45F, 45B which make up the lift/down coupling mechanism described later, in such a manner that the bar guides 24F, 24B are slidable each of the feed, left clamp, right clamp, left lift and right lift functions needs independently its own motor.

In this embodiment, the use of the accumulator 57 allows the capacity of the hydraulic pump 51 to be set smaller than the pump capacity required to drive the largest lift cylinder device 30. Also, the hydraulic pressure supplier means 50 (51, 52, 53, 54, 57) is installed at a remote location distanced from the pressing machine.

As seen from FIG. 1, hydraulic valve means 60 comprises regulating valves 61AR, 61CAL, 61CAR, 61LDL and 61LDR disposed correspondingly to cylinder devices 30, 20L, 20R, 40L and 40R, and valve controllers 62AR, 62CA and 62LD, and the like.

The regulating valve 61AR is a control servo valve which is provided with ports A, B communicating with the feed cylinder device 30 via pipings 65, 66, port I communicating with the accumulator 57 (hydraulic pump 51) via piping 64, and port O communicating with the oil tank 54 via piping 67. This control servo valve 61AR directly controls the cylinder device 30.

The valve controller 62AR outputs a control signal CNT to activate the servo valve 61AR for advance operation or return operation. Provided further in this embodiment are a position setter 63P and a speed setter 63S for setting or modifying the stroke (ending point and starting point) speed. Receiving the feedback signal f from the feed cylinder device 30 (33), the valve controller 62AR controls speed and position. These constitute a closed control system.

Each of regulating valves 61CAL, 61CAR, 61LDL and 61LDR is structurally and functionally equivalent to the regulating valve 61AR, and each of valve controllers 62CA and 62LD is structurally and functionally equivalent to the valve controller 62AR. No description about them is thus repeated. For left and right synchronization, however, valve controllers 62CA and 62LD are coupled to the pair of regulating valves 61CAL and 61CAR and the pair of regulating valves 61LDL and 61LDR, respectively. The valve controller 62LD has arc orbit motion compensation. It should be noted that the motion of the link 47F (47B), rotating in a semi-circular orbit with its center on the pin 48F (48B), causes the lift bar 44 to move linearly in the Z direction.

Driver control means 70, made up of logic circuits and computers, switches and controls hydraulic valve means 60 (62AR, 62CA, 62LD) according to a predetermined sequence. Indicated at 75 is an angle detector for detecting the angle of the crank shaft, for example, an absolute encoder with a resolution of 0.1 to 0.5 degree.

Figure 4:
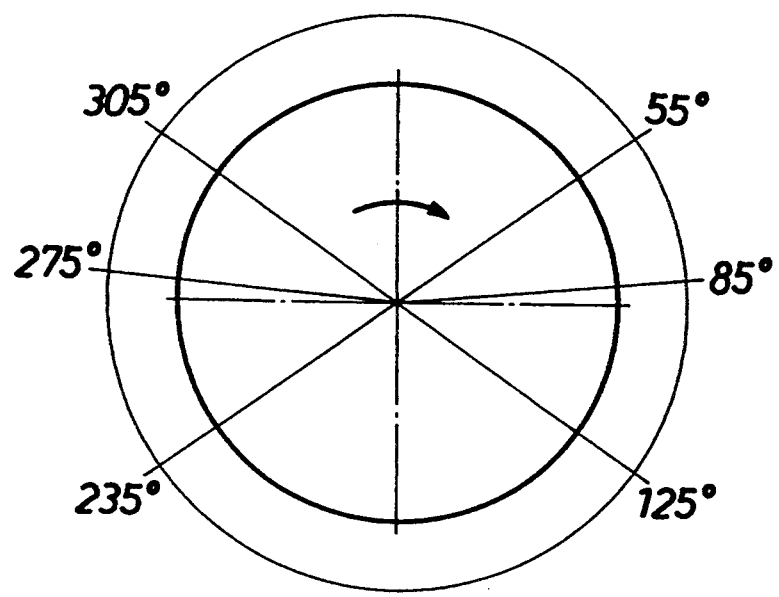
FIG. 4 illustrates the switching sequence of operations.

The pressing machine in this embodiment is designed to perform each motion according to the crank angle, as shown in FIG. 4. The driver control means 70 sends signal Sd shown in FIG. 1 to the valve controller 62LD when the crank angle detected by the angle detector 75 is within a predetermined range of 55 to 85 degrees. Similarly, the driver control means 70 sends unclamp signal Sac to the valve controller 62CA when the detected crank angle is within the range of 85 to 125 degrees, return signal Sr to the valve controller 62AR when the detected crank angle is within the range of 125 to 235 degrees, clamp signal Sc when the detected crank angle is within the range 235 to 275 degrees, lift signal Sl when the detected crank angle is within the range of 275 to 305 degrees, and advance signal Sa when the detected crank angle is within the range 305 to 355 degrees.

Settings of crank angles corresponding to the starting and ending points of each motion may be modified.

The operation of the device is described below.

For convenience of description, it is assumed that the pressing machine is at an initial state in which the crank angle is at 235 degrees in FIG. 4 and the feed bars 10F, 10B take the state as shown in FIGS. 2 and 3 with a return operation just completed. Also assumed is that the driver control means 70 has already output the motor driving signal DRV shown in FIG. 1 to the driver 53 before the pressing machine is started, that hydraulic pressure of the accumulator 57 is set to a predetermined one with the motor 52 and the hydraulic pump 51 operating, and that the setters 63P, 63S are set to respective predetermined values. Also, clamping and unclamping operations and lifting and lowering operations are described primarily with respect to the left sides of the feed bars, such operation on the right sides being understood to be similar.

When the pressing machine is switched on, the driver control means 70 sends the clamp signal Sc to the valve controller 62CA. The valve controller 62CA, in turn, outputs control signals CNT to regulating valves 61CAL, 61CAR functioning as servo valves.

Hydraulic pressure is applied by ports A via pipings 65 shown in FIG. 1 to the clamp cylinders 20L, 20R, and then pistons 22L, 22R are simultaneously pushed out to the left in FIG. 1.

Namely, on the left hand side of the pressing machine, the clamp driver shaft 26C is moved to the right in FIG. 2, and the clamp driver shaft 26D is moved to the left by the rack member 27C, the pinion 28 and the rack member 27D. As a result, both feed bars 10F, 10B mutually access to the center in FIGS. 1 and 2 by the clamp blocks 25F, 25B, thereby clamping transfer mold materials (workpieces).

This clamp motion is performed at a predetermined speed according to a predetermined stroke. When a crank angle of 275 degrees is reached, the clamp motion is terminated.

In the meantime, the accumulator 57 supplies hydraulic pressure for clamp motion to the port I (port I) of the regulating valve 61CAL (61CAR) via piping 64. At the same time, hydraulic fluid for unclamp motion, inside the cylinder device 20L (20R), is discharged from the port O (port O) via pipings 66 (66) and port B (port B), and then circulated back to the oil tank 54 via pipings 67. For unclamp motion, hydraulic fluid for unclamp motion is supplied to the cylinder device 20L (20R) via ports I and B while hydraulic fluid is discharged into the oil tank 54 via ports A and O.

When the crank angle reaches 275 degrees, the driver control means 70 outputs the lift signal S1 to the valve controller 62LD. The valve controller 62LD sends the control signals CNT simultaneously to the regulating valves 61LDL, 61LDR, causing the pistons 42L, 42R of respective cylinder devices 40L, 40R to be retracted to the right in FIG. 1.

When the piston 42L is retracted in FIG. 3, the links 47F, 47B rotate clockwise respectively around the support pins 48F, 48B, from their position illustrated by solid line to the position illustrated by phantom line.

The lift bar 44 shifts upward in the Z direction with its position kept level. Both feed bars 10F, 10B, with material clamped, are lifted by the lift pins 45F, 45B.

This lift operation is terminated when a crank angle of 305 degrees is reached.

Since the link 47F is urged with a constant force by the cylinder device 4, no undue force is applied to the lift cylinder 40L (40R). The lift cylinder 40L (40R) is rotatably supported at the pin 2P by the frame 1, and thus the rotational movement of the lift bar 44 is smoothly absorbed.

When the crank angle reaches 305 degrees, the driver control means 70 outputs the advance signal Sa to the valve controller 62AR. The valve controller 62AR sends the control signals CNT to the regulating valve 61AR to supply hydraulic pressure to the feed cylinder device 30 via port B. The piston 32 is thus retracted to the right in FIG. 1.

In FIG. 2, when the piston 32 is retracted moving the slider 35 from its position illustrated by solid line to the position illustrated by phantom line, the feed bars 10F, 10B are advanced while sliding on the respective feed bar guides 24F, 24B. In this case, since feed bars 10F, 10B keep clamping material as a result of previous clamping operation, and remain elevated as a result of previous lift operation, the feed bars may transfer the material to a succeeding mold by clamping it from the previous mold without interference from other machines.

To set the material to the next mold, the down operation, at a crank angle range from 55 to 85 degrees, and the unclamp operation, at a crank angle range from 85 to 125 degrees, should be completed. After setting the material, the return operation at a crank angle range from 125 to 235 degrees may be performed to proceed to the next step. These operations, however, are similar to the above described operations except that the feed bars 10F, 10B are operated in a reverse manner, and thus no description will be provided herein.

The embodiment according to the present invention comprises the feed cylinder device 30, the pair of clamp cylinder devices 20L, 20R, the common hydraulic pressure supplier means 50, the hydraulic valve means including a plurality of servo valves, and the driver control means 70, whereby hydraulic pressure is selectively supplied to the cylinder devices to drive them into linear motion by the hydraulic pressure supplier means 50, common to all the cylinder devices and having a minimum possible capacity, and the feed bars 10F, 10B are directly driven in a linear motion. The embodiment according to the present invention thus achieves a simple construction, and a power-saving, compact, low-cost design which is easy to handle and flexibly adaptable to different applications, compared to a conventional mechanical or motor-driven device in which rotary motion is converted into linear motion. Compared to the conventional hydraulically driven device, a substantial cost decrease may be achieved with the present invention.

Cylinder devices 20L, 20R, 30 are precision positioning cylinder devices having respective absolute encoder 23L, 23R, 33 for generating feedback signals f, and are operable at a predetermined stroke and predetermined speed. Thus, material may be clamped in a assured manner and fed to a next mold.

Three dimensional transfer is achieved by allowing lift/down operation by means of the cylinders 40L, 40R. Thus, the feeding of material is carried out in a smooth manner, increasing adaptability to applications.

Cylinder devices 20L, 30, 40L are coupled to the feed bars 10F, 10B via a simply structured coupling mechanism including 26C, 26D, 24F, 24B, 35, 37F, 37B, 44, 45F, 45B, 47F, 47B. Thus, the number of cylinder devices is minimized, reducing manufacturing cost, allowing easy assembly and reducing installation space.

The hydraulic pressure supplier means 50 comprises a single hydraulic pump 51 of which capacity is no greater than the capacity capable of driving the largest feed cylinder device 30. The hydraulic pump 51 is commonly used to drive the cylinder devices 30, 20L, 20R, 40L and 40R by switching properly from one cylinder device to another. compared to the conventional motor-driven device in which for each operation its own dedicated motor is provided, the capacity of the power supply system may be reduced. From this point of view, an even more compact and low cost design may be achieved.

Since the hydraulic pressure supplier means 50 is associated with the accumulator 57, accumulation of energy of hydraulic pressure is possible. The capacities of the driving motor 52 of the hydraulic pump 51 and its driver 53 may be reduced in the sense that no electric energy is accumulated in the conventional motor-driven device. Since the motor 52 may be left running in a continuous operation, maximum operating efficiency and thus power saving may be achieved.

Hydraulic pressure output by the hydraulic pump 51 is subjected to variations as a result of voltage variations, and such hydraulic pressure variations cause pulsating oil flow. The accumulator 57 regulates pulsating oil flow, providing stable hydraulic pressure. Thus, each operation of the device may be performed in a precise and smooth manner.

The hydraulic pressure supplier means 50 may be installed in a remote location, separate from the location of the cylinder devices 20L, 20R, 30, 40L and 40R. This allows easiness in planning the layout of the pressing machine at installation, and leaves space for other machines.

The hydraulic valve means 60 comprises regulating valve 61AR, 61CAL and other valves, each functioning as a control servo valve, corresponding to cylinder devices 30, 20L, and other cylinder devices, and valve controllers 62AR, 62CA and other valve controllers. These components form closed loop control systems which work in response to feedback signals f output by encoders 33, 33L and other encoders. Thus, each cylinder device exactly performs its own assigned operation (advance, return, clamp or unclamp) moving by a predetermined stroke for a predetermined duration.

Each of the valve controllers 62AR, 62CA and 62LD is provided with a position setter 63P and a speed setter 63S. This allows feed pitch and feed rate of material to be selected or modified in a timely manner. Thus, this makes the transfer device easy to handle and adaptive to a variety of applications.

Valve controllers 62CA and 62LD are, respectively, common to the pair of left and right cylinder devices 20L and 20R and to the pair of left and right cylinder devices 40L and 40R. Thus, the devices suffer neither looseness in mechanical parts due to wear, which would be encountered in the conventional mechanical device, nor performance variations due to slippage of motors, which would be encountered in the conventional motor-driven device. This allows the feed bars 10F, 10B to perform on both their left and their right side ends, accurate and completely synchronized clamp/unclamp and lift/down operations. Thus, the unsuccessful gripping of material may be avoided, and precision transfer of material is assured.

In response to low level control signals CNT, the valve controllers 62AR, 62CA and 62LD control respective control servo valves (61AR, 61CAL, 61CAR, 61LDL and 61LDR) for regulating high hydraulic pressure. A small capacity control system and compact design are achieved, compared to the conventional motor-driven device in which large driving power fed to motors is directly controlled. This substantially simplifies internal wiring operations for the pressing machine.

In response to an accurate crank angle detected by the angle detector 75, the driver control means 70 outputs the advance signal Sc, down signal Sd, unclamp signal Sac and other signals. This allows the slide to perform up and down stroke motion in a completely synchronized manner. Thus, material is transferred, without any interference, in a smooth manner.

Starting and ending crank angles for each operation may be set or modified in the driver control means 70, and thus the transfer function is performed in a timely manner in accordance with the slide stroke of the pressing machine. Maximum acceleration for each operation is thus reduced, and rigidity requirements for coupling mechanisms may be lowered.

Installation of conventional rotary motion to linear motion converter mechanisms, or heat emitting rotary motors is not required. Instead, installed in the pressing machine are linear motion cylinder devices 30, 20L and the like. Thus, safe installation is assured. No particular steps to control radiation of heat are required. Since expansion and contraction of components due to heat emission do not take place, accuracy degradation associated with them will not occur.

In the above embodiment, each cylinder is coupled to the feed bars 10F, 10B via coupling mechanisms. Alternatively, each cylinder may be directly coupled to the feed bars 10F, 10B. The use of simply structured coupling mechanisms allows the number of cylinder devices to be minimized without pushing up manufacturing cost and thus allows space to be left available inside the pressing machine, compared to when a conventional rotary motion to linear motion converter mechanism is used.

Although the valve controllers 62AR, 62CA and 62CD are separately disposed in the embodiment, they may be integrated into a single unit. Or, alternatively, they may be integrated with the driver control means 70. For example, they may be integrated with pressing machine control panel (including CPU, ROM, RAM and the like) which controls the entire pressing machine so that components of the panel may function as a valve controller in addition to their own function in the panel. The driver control means 70 carries out each operation sequentially in a continual and step-by-step manner as shown in FIG. 4. Alternatively, however, the end portion of advance operation and the start portion of down operation may partly overlap.

The hydraulic pressure supplier means 50 is formed of a single hydraulic pump 51 capable of driving the largest feed cylinder 30. When two successive operations partly overlap as described above, the capacity of the hydraulic pump 51 is set to equal to the sum of capacity which allows two cylinders to perform simultaneously two overlapped operations.

As described above, the present invention comprises linear motion feed and clamp cylinder devices, hydraulic pressure supplier means common to all the cylinder devices, hydraulic valve means including a plurality of servo valves, and driver control means, whereby hydraulic pressure by minimum capacity hydraulic pressure supplier means is switchably supplied to each of the cylinder means according a predetermined sequence. The above arrangement eliminates disadvantages of the conventional devices, such as complex and costly construction, and narrow adaptability to applications, all these resulting from the use of a rotary motion to linear motion converter mechanism. The above arrangement further achieves power saving, widening adaptability to a diversity of applications, simple and compact structure and low cost design. Easy-to-handle, high-speed and precision transfer operation is thus achieved.

What is claimed is:

1. A transfer device for a pressing machine, comprising:
- a pair of feed bars for feeding a workpiece in a longitudinal direction in the pressing machine;
- a feed cylinder device with an absolute encoder for applying force to said feed bars for advance and return movements in the longitudinal direction.
- a pair of left and right clamp cylinder devices, each with an absolute encoder, for applying force to said feed bars for clamp or unclamp movements of said feed bars in lateral direction perpendicular the longitudinal direction,
- hydraulic pressure supplier means, common to the cylinder devices, for supplying hydraulic pressure to each of the cylinder devices for motion generation,
- hydraulic valve means, having a plurality of servo valves directly controlling each cylinder device in response to feedback signal from the absolute encoder of each cylinder device, for supplying hydraulic pressure from the hydraulic pressure supplier means to each of the cylinder devices so that each cylinder device is driven by a predetermined stroke at a predetermined speed and
- driver control means for selecting between the hydraulic valve means for control according to a predetermined switching sequence.

2. An apparatus according to claim 1, wherein said hydraulic valve means includes feed hydraulic valve means for supplying hydraulic pressure to said feed cylinder device and clamp hydraulic valve means for supplying hydraulic pressure to said clamp cylinder devices, said driver control means selecting between the feed and clamp hydraulic valve means.

3. An apparatus for moving a workpiece between stages of a pressing machine, comprising:
- a pair of feed bars for feeding a workpiece in a longitudinal direction in the pressing machine:
- a plurality of cylinder devices, each for moving the feed bars linearly and having a respective absolute encoder, the plurality of cylinder devices including
- a feed cylinder device, responsive to hydraulic pressure to linearly advance and return the feed bars in the longitudinal direction, and
- first and second clamp cylinder devices, responsive to hydraulic pressure to move the feed bars linearly toward and away from each other in a lateral direction perpendicular to the longitudinal direction so as to clamp and unclamp the workpiece between the feed bars;
- a hydraulic pressure supplying means, common to each of said plurality of cylinder devices;
- hydraulic valve means having a plurality of servo valves, a respective servo valve being associated with each of said plurality of cylinder devices, each of said servo valves being selectively actuatable to apply the hydraulic pressure from said supplying means to move the associated cylinder device, and thus the feed bars, with a predetermined stroke and at a predetermined speed, in response to a feedback signal from the absolute encoder of said associated cylinder device; and
- control means for controlling said hydraulic valve means so that said servo valves are actuated in a predetermined sequence.

4. An apparatus according to claim 3, wherein said hydraulic pressure supply means comprises only one hydraulic pump, said pump in fluid communication with each of said plurality of servo valves.

5. An apparatus according to claim 3, wherein said feed cylinder device is arranged to move the feed bars in a horizontal direction of advancement and return, said plurality of cylinder devices further including first and second lift cylinder devices, responsive to hydraulic pressure to move the feed bars vertically.

6. An apparatus according to claim 5, wherein said first and second lift cylinder devices apply linear forces to respective opposite first and second ends of the feed bars.

7. An apparatus according to claim 3, wherein said first and second clamp cylinder devices apply linear forces to respective opposite first and second ends of the feed bars.

8. An apparatus according to claim 3, wherein said hydraulic valve means includes:
- a first valve controller, actuatable by said control means to activate the servo valve associated with said feed cylinder device, said first valve controller controlling the speed and stroke of said feed cylinder device according to the feedback signal from the absolute encoder of said feed cylinder device; and
- a second valve controller, actuatable by said control means to activate the servo valves associated with said first and second clamp cylinder devices, said second valve controller controlling the speed and stroke of said clamp cylinder devices according to the feedback signals from the absolute encoders of said clamp cylinder devices.

9. An apparatus according to claim 8, further comprising an angle detector for detecting the rotational angle of a crankshaft of the press, said control means selectively actuating said first valve controller and said second valve controller, in response to a signal from said angle detector, according to the detected rotational angle of the crankshaft.

10. An apparatus according to claim 3, further comprising an angle detector for detecting the rotational angle of a crankshaft of the press, said control means controlling said hydraulic valve means in response to a signal from said angle detector, according to the detected rotational angle of the crankshaft.

11. An apparatus according to claim 3, wherein said first and second clamp cylinder devices are arranged so that with two feed bars lying generally parallel to each other, said first clamp cylinder device is actuatable to apply oppositely directed linear forces to respective adjacent first ends of the two feed bars so as to move the first ends toward or apart from each other, and said second clamp cylinder device is actuatable to apply oppositely directed linear forces to respective adjacent second ends of the two feed bars so as to move the second ends toward or apart from each other.

12. A transfer device of a pressing machine, comprising:
   a pair of feed bars for feeding a workpiece in a first direction in the pressing machine;
   a plurality of cylinder devices, each having a respective absolute encoder, the plurality of cylinder devices including
   a feed cylinder device for applying a linear force to move the feed bars in the first direction, in an advance/return mode, and
   a pair of first and second clamp cylinder devices, for applying a linear force to the feed bars to move the feed bars toward and away from each other in a second direction different than the first direction, for clamping and unclamping the workpiece;
   a hydraulic pressure supplier means, common to each of said plurality of cylinder devices;
   a feed hydraulic valve means actuatable to supply hydraulic pressure from said hydraulic pressure supplier means to said feed cylinder device to drive said feed cylinder device at a predetermined stroke and speed, the feed hydraulic valve means having a feed servo valve and directly controlling said feed cylinder device through said feed servo valve, in response to a feedback signal from the absolute encoder of said feed cylinder device;
   clamp hydraulic valve means, actuatable to supply hydraulic pressure to said pair of first and second clamp cylinder devices to drive said pair of clamp cylinder devices at a predetermined speed and stroke, said clamp hydraulic valve means having first and second clamp servo valves and directly controlling the first clamp cylinder device and second clamp servo valves and directly controlling the first clamp cylinder device and second clamp cylinder device, respectively, through said first clamp servo valve and said second clamp servo valve, respectively, in response to feedback signals from the absolute encoders respectively of said first clamp cylinder device and said second clamp cylinder device; and
   driver control means for selectively actuating said feed hydraulic valve means and said clamp hydraulic valve means in a predetermined sequence.

13. An apparatus according to claim 12, wherein said feed hydraulic valve means applies hydraulic pressure to said feed cylinder means in the first direction, and said clamp hydraulic valve means applies hydraulic pressure to said pair of first and second clamp cylinder means in the second direction.

14. An apparatus according to claim 13, wherein said driver control means selectively actuates only one of said feed hydraulic valve means and said clamp hydraulic valve means at a time.

15. An apparatus according to claim 14, wherein the first and second directions are horizontal directions, said plurality of cylinder devices further including a pair of first and second lift cylinder devices, responsive to hydraulic pressure to move the feed bars vertically, further comprising lift hydraulic valve means, actuatable to supply hydraulic pressure from said hydraulic pressure supplier means to said pair of first and second lift cylinder devices to drive said pair of lift cylinder devices at a predetermined speed and stroke, said lift hydraulic valve means having first and second lift servo valves and directly controlling the first lift cylinder device and second lift cylinder device, respectively, through said first lift servo valve and said second lift servo valve, respectively, in response to feedback signals from the absolute encoders respectively of said first lift cylinder device and said second lift cylinder device; said driver control means selectively actuating only one of said feed hydraulic valve means, said clamp hydraulic valve means and said lift hydraulic valve means at a time.

16. An apparatus according to claim 15, wherein said first and second lift cylinder devices apply linear forces to respective opposite first and second ends of the feed bars and said first and second clamp cylinder devices apply linear forces to the respective opposite first and second ends of the feed bars.

17. An apparatus according to claim 16, further comprising an angle detector for detecting the rotational angle of a crankshaft of the press, said drive control means controlling the feed, clamp and lift hydraulic valve means in response to respective signals from said angle detector, according to the detected rotational angle of the crankshaft, to actuate said feed cylinder device, said pair of clamp cylinder devices and said pair of lift cylinder devices at different times, different speeds and different strokes.

18. An apparatus according to claim 12, wherein the first direction and the second direction are perpendicular to each other, said driver control means selectively actuating only one of said feed hydraulic valve means and said clamp hydraulic valve means at a time.

19. An apparatus according to claim 12, wherein said driver control means selectively actuates only one of said feed hydraulic valve means and said clamp hydraulic valve means at a time.

20. An apparatus according to claim 3, wherein said control means selectively actuates only one of said feed hydraulic valve means and said clamp hydraulic valve means at a time.

21. An apparatus according to claim 20, wherein said hydraulic valve means applies hydraulic pressure to said feed cylinder device in the first direction and applies hydraulic pressure to said pair of first and second clamp cylinder devices in the second direction.

* * * * *